(12) United States Patent
Hsu

(10) Patent No.: US 6,574,521 B2
(45) Date of Patent: Jun. 3, 2003

(54) SYSTEM AND METHOD FOR MANAGING WORK-IN-PROCESS (WIP) WORKLOAD WITHIN A FABRICATION FACILITY

(75) Inventor: Kuang-Huan Hsu, Chia-yi (TW)

(73) Assignee: Taiwan Semiconductor Manufacturing Co., Ltd, Hsin Chu (TW)

(*) Notice: Subject to any disclaimer, the term of this patent is extended or adjusted under 35 U.S.C. 154(b) by 186 days.

(21) Appl. No.: 09/848,591

(22) Filed: May 3, 2001

(65) Prior Publication Data

US 2002/0165633 A1 Nov. 7, 2002

(51) Int. Cl.$^7$ .............................................. G06F 19/00
(52) U.S. Cl. .............................. 700/99; 700/121; 705/8
(58) Field of Search ........................... 700/97–102, 121

(56) References Cited

U.S. PATENT DOCUMENTS

| | | | |
|---|---|---|---|
| 5,612,886 A | | 3/1997 | Weng |
| 5,748,478 A | | 5/1998 | Pan et al. |
| 5,751,580 A | * | 5/1998 | Chi ........................... 700/101 |
| 5,818,716 A | | 10/1998 | Chin et al. |
| 5,838,565 A | * | 11/1998 | Hsieh et al. .................. 700/11 |
| 5,889,673 A | * | 3/1999 | Pan et al. ..................... 700/97 |
| 5,971,585 A | | 10/1999 | Dangat et al. |
| 6,128,588 A | | 10/2000 | Chacon |
| 6,263,253 B1 | * | 7/2001 | Yang et al. ................... 700/99 |

OTHER PUBLICATIONS

"Mix–and–Match: A Necessary Choice", Ruth DeJule, Semiconductor International, Feb. 2000I, pp 66–67.

* cited by examiner

Primary Examiner—Leo Picard
Assistant Examiner—Douglas S. Lee
(74) Attorney, Agent, or Firm—Tung & Associates

(57) ABSTRACT

Within both a system and a method for managing within a fabrication facility a work-in-process (WIP) workload within the fabrication facility there is first provided a fabrication facility comprising: (1) a plurality of fabrication tools which perform an equivalent fabrication function; and (2) at least one quantity of existing work-in-process (WIP) workload which requires multiple sequential processing within only one fabrication tool within the plurality of fabrication tools which perform the equivalent fabrication function. There is then determined for the plurality of fabrication tools a plurality of tool loading coefficients which take into consideration complete processing of the at least one quantity of work-in-process (WIP) workload which requires multiple sequential processing within the only one fabrication tool within the plurality of fabrication tools. There is then introduced into the fabrication facility a quantity of new work-in-process (WIP) workload which also requires multiple sequential processing within only one fabrication tool within the plurality of fabrication tools which performs the equivalent fabrication function, wherein the quantity of new work-in-process (WIP) workload is allocated to a fabrication tool within the plurality of fabrication tools having a most favorable tool loading coefficient within the plurality of tool loading coefficients.

14 Claims, 2 Drawing Sheets

SYSTEM AND METHOD FOR MANAGING WORK-IN-PROCESS (WIP) WORKLOAD WITHIN A FABRICATION FACILITY

BACKGROUND OF THE INVENTION

1. Field of the Invention

The present invention relates generally to systems and methods for managing work-in-process (WIP) workload within fabrication facilities. More particularly, the present invention relates to systems and methods for efficiently managing work-in-process (WIP) workload within fabrication facilities.

2. Description of the Related Art

Microelectronic fabrications are formed from microelectronic substrates over which are formed patterned microelectronic conductor layers which are separated by microelectronic dielectric layers.

As microelectronic fabrication integration levels have increased and microelectronic device and patterned microelectronic conductor layer dimensions have decreased, so also has increased the complexity of microelectronic fabrication processing methods and microelectronic fabrication processing facilities which are employed for fabricating microelectronic fabrications. The increased complexity of microelectronic fabrication processing methods and microelectronic fabrication processing facilities which are employed for fabricating microelectronic fabrications derives in-part from: (1) the length (i.e., total number of process steps) of a typical microelectronic fabrication process description; along with (2) the variety of microelectronic fabrication process tools which is typically employed for fabricating a typical microelectronic fabrication; further in conjunction with (3) the variety of individual microelectronic fabrications (i.e., part numbers) which is typically fabricated within a typical microelectronic fabrication processing facility; still further in conjunction with (4) any specific microelectronic fabrication tool routing requirements which may be encountered when fabricating a particular microelectronic fabrication or a particular class of microelectronic fabrications within either a single microelectronic fabrication processing facility or a plurality of microelectronic fabrication processing facilities.

Further contributing to the complexity of microelectronic fabrication processing methods and microelectronic fabrication processing facilities is the generally distributed (i.e., nonlinear) nature of microelectronic fabrication processing methods and microelectronic fabrication processing facilities, which further allows for various production priorities and dispatching rules when fabricating multiple microelectronic fabrication part numbers within either individual microelectronic fabrication processing facilities or multiple microelectronic fabrication processing facilities. Such varied production priorities and dispatching rules in-turn often provide difficulties in management of microelectronic fabrication work-in-process (WIP) workload within microelectronic fabrication processing facilities.

In light of the foregoing, it is thus desirable in the art of microelectronic fabrication to provide systems and methods for efficiently managing microelectronic fabrication work-in-process (WIP) workload within microelectronic fabrication facilities.

It is towards the foregoing object that the present invention is directed.

Various systems and methods have been disclosed in the arts of manufacturing and fabrication for managing fabrication workload within fabrication facilities, such as but not limited to microelectronic fabrication work-in-process (WIP) workload within microelectronic fabrication facilities.

For example, Weng, in U.S. Pat. No. 5,612,886, discloses a system and a method for managing, with enhanced efficiency, semiconductor integrated circuit microelectronic fabrication work-in-process (WIP) workload within a semiconductor integrated circuit microelectronic fabrication facility. To realize the foregoing object, the system and the method employ a dynamic dispatching algorithm which in turn employs a sorting of semiconductor integrated circuit microelectronic fabrication work-in-process (WIP) workload by both priority and queue time, and further wherein the dynamic dispatching algorithm incorporates both semiconductor substrate release rules and semiconductor integrated circuit microelectronic fabrication dispatch rules.

In addition, Pan et al., in U.S. Pat. No. 5,748,478, disclose a system and a method for optimizing output workload of a fabrication facility, such as but not limited to a semiconductor integrated circuit microelectronic fabrication facility. To realize the foregoing object, the system and the method provide, in general, for determining a work-in-process (WIP) workload inflow within the fabrication facility, for determining a work-in-process (WIP) workload output within the fabrication facility and for calculating a work-in-process (WIP) workload flow intensity within the fabrication facility.

Further, Chin et al., in U.S. Pat. No. 5,818,716, also disclose a system and a method for managing, with enhanced efficiency, work-in-process (WIP) workload within a fabrication facility, such as but not limited to semiconductor integrated circuit microelectronic fabrication work-in-process (WIP) workload within a semiconductor integrated circuit microelectronic fabrication facility. To realize the foregoing object, the system and the method employ a required turn rate (RTR) algorithm which determines not only a due date and a production priority for the work-in-process (WIP) workload within the fabrication facility, but also provides for local dispatching of the work-in-process (WIP) workload within the fabrication facility.

Still further, Dangat et al., in U.S. Pat. No. 5,971,585, discloses a method for optimizing within a fabrication facility, such as but not limited to a microelectronic fabrication facility, fabrication assets with respect to fabrication demands, such as to determine which fabrication demands may be met, and thus manage a workload within the fabrication facility. To realize the foregoing object, the method employs a best can do (BCD) algorithm for matching the fabrication assets with respect to fabrication demands, where the best can do (BCD) algorithm comprises a forward implode feasible plan solver which may alternatively employ either heuristic decision technology or linear programming decision technology.

Finally, Chacon, in U.S. Pat. No. 6,128,588, discloses a system and a method for optimizing within a microelectronic fabrication facility, and in particular within a semiconductor integrated circuit microelectronic fabrication facility, operation of the microelectronic fabrication facility, and in particular the semiconductor integrated circuit microelectronic fabrication facility. To realize the foregoing object the system and the method employ, in addition to a microelectronic fabrication facility manufacturing execution system (MES) system, a correlating microelectronic fabrication facility scheduling simulation system.

In addition, and although not specifically directed towards systems and methods for efficiently managing work-inprocess (WIP) workload within fabrication facilities, DeJule, in "Mix-and-Match: A Necessary Choice," Semiconductor International, February 2000, pp. 66–67, discusses a continuing object and trend with respect to advanced semiconductor integrated circuit microelectronic fabrication of continued decreases in overlay tolerances within advanced semiconductor integrated circuit microelectronic fabrications. To realize the foregoing object, it is typically desirable within the art of advanced semiconductor integrated circuit microelectronic fabrication when fabricating advanced semiconductor integrated circuit microelectronic fabrications to route individual semiconductor integrated circuit microelectronic fabrication work in process (WIP) workload lots through identical photolithographic fabrication tools or matched photolithographic fabrication tools for each of multiple sequential photolithographic processing steps employed when fabricating advanced semiconductor integrated circuit microelectronic fabrication work-in-process (WIP) workload lots.

Desirable in the art of microelectronic fabrication are additional systems and methods which may be employed for efficiently managing microelectronic fabrication work-in-process (WIP) workload within microelectronic fabrication facilities.

It is towards the foregoing object that the present invention is directed.

SUMMARY OF THE INVENTION

A first object of the present invention is to provide a system and a method for managing microelectronic fabrication work-in-process (WIP) workload within a microelectronic fabrication facility.

A second object of the present invention is to provide a system and a method in accord with the first object of the present invention, wherein the system and the method are readily commercially implemented.

In accord with the objects of the present invention, there is provided by the present invention a system and a method for managing within a fabrication facility, such as but not limited to a microelectronic fabrication facility, a work-in-process (WIP) workload, such as but not limited to a microelectronic fabrication work-in-process (WIP) workload.

To practice the method of the present invention, there is first provided a fabrication facility comprising: (1) a plurality of fabrication tools which perform an equivalent fabrication function; and (2) at least one quantity of existing work-in-process (WIP) workload which requires multiple sequential processing within only one fabrication tool within the plurality of fabrication tools which performs the equivalent fabrication function. There is then determined for the plurality of fabrication tools which perform the equivalent fabrication function a corresponding plurality of tool loading coefficients which take into consideration complete processing of the at least one quantity of existing work-in-process (WIP) workload which requires multiple sequential processing within the only one fabrication tool within the plurality of fabrication tools which perform the equivalent fabrication function. There is then introduced into the fabrication facility a quantity of new work-in-process (WIP) workload which also requires multiple sequential processing within only one fabrication tool within the plurality of fabrication tools which performs the equivalent fabrication function, wherein the quantity of new work-in-process (WIP) workload is allocated to a fabrication tool within the plurality of fabrication tools which perform the equivalent fabrication function having a most favorable tool loading coefficient within the plurality of tool loading coefficients.

The method of the present invention contemplates a system, and in particular a computer implemented system, which may be employed for practicing the method of the present invention.

The present invention provides a system and a method for managing within a fabrication facility, such as but not limited to a microelectronic fabrication facility, a work-in-process (WIP) workload, such as but not limited to a microelectronic fabrication work-in-process (WIP) workload.

The present invention realizes the foregoing object by employing within a fabrication facility comprising: (1) a plurality of fabrication tools which perform an equivalent fabrication function; and (2) at least one quantity of existing work-in-process (WIP) workload which requires multiple sequential processing within only one fabrication tool within the plurality of fabrication tools which perform the equivalent fabrication function; (3) a determination for the plurality of fabrication tools which perform the equivalent fabrication function of a corresponding plurality of tool loading coefficients which take into consideration complete processing of the at least one quantity of existing work-in-process (WIP) workload which requires multiple sequential processing within the only one fabrication tool within the plurality of fabrication tools which perform the equivalent fabrication function. Similarly, the present invention also provides that upon introducing into the fabrication facility a quantity of new work-in-process (WIP) workload which also requires multiple sequential processing within only one fabrication tool within the plurality of fabrication tools which perform the equivalent fabrication function, the quantity of new work-in-process (WIP) workload is allocated to a fabrication tool within the plurality of fabrication tools which perform the equivalent fabrication function having a most favorable tool loading coefficient within the plurality of tool loading coefficients.

The system of the present invention and the method of the present invention are readily commercially implemented. As will be illustrated in greater detail within the context of the Description of the Preferred Embodiment which follows, the present invention employs fabrication assets, fabrication resources and fabrication systems which are either generally employed within the art of microelectronic fabrication or readily adapted to the art of microelectronic fabrication. Since it is thus a specific configuration of fabrication assets, fabrication resources and fabrication systems which provides at least in part the present invention, rather than the existence of fabrication assets, fabrication resources and fabrication systems which provides the present invention, the system of the present invention and the method of the present invention are readily commercially implemented.

BRIEF DESCRIPTION OF THE DRAWINGS

The objects, features and advantages of the present invention are understood within the context of the Description of the Preferred Embodiment, as set forth below. The Description of the Preferred Embodiment is understood within the context of the accompanying drawings, which form a material part of this disclosure, wherein.

DESCRIPTION OF THE PREFERRED EMBODIMENTS

Figure 1:
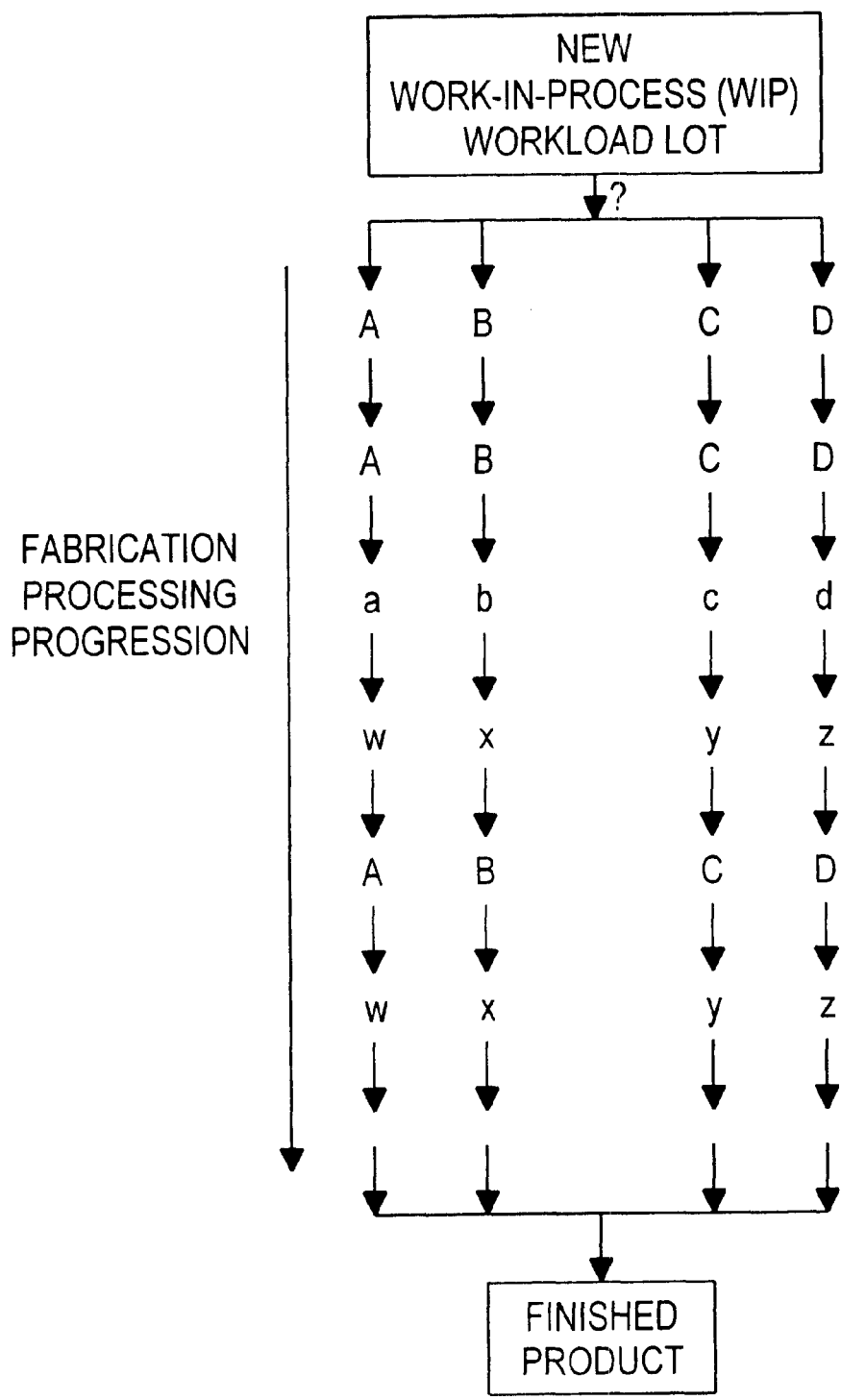
FIG. 1 shows with respect to a fabrication facility a schematic diagram of Fabrication Processing Progression to Finished Product illustrating a problem towards whose resolution the present invention is directed.

The present invention provides a system and a method for efficiently managing within a fabrication facility, such as but not limited to a microelectronic fabrication facility, a work-in-process (WIP) workload, such as but not limited to a microelectronic fabrication work-in-process (WIP) workload.

The present invention realizes the foregoing object by employing within a fabrication facility comprising: (1) a plurality of fabrication tools which perform an equivalent fabrication function; and (2) at least one quantity of existing work-in-process (WIP) workload which requires multiple sequential processing within only one fabrication tool within the plurality of fabrication tools which perform the equivalent fabrication function; (3) a determination for the plurality of fabrication tools which perform the equivalent fabrication function of a corresponding plurality of tool loading coefficients which take into consideration complete processing of the at least one quantity of work-in-process (WIP) workload which requires multiple sequential processing within the only one fabrication tool within the plurality of fabrication tools which perform the equivalent fabrication function. Similarly, the present invention also provides that upon introducing into the fabrication facility a quantity of new work-in-process (WIP) workload which also requires multiple sequential processing within only one fabrication tool within the plurality of fabrication tools which perform the equivalent fabrication function, the quantity of new work-in-process (WIP) workload is allocated to a fabrication tool within the plurality of fabrication tools which performs the equivalent fabrication function having a most favorable tool loading coefficient within the plurality of tool loading coefficients.

Although the present invention provides particular value within the context of managing a microelectronic fabrication work-in-process (WIP) workload within a microelectronic fabrication facility, and more particularly within the context of managing a semiconductor integrated circuit microelectronic fabrication work-in-process (WIP) workload within a semiconductor integrated circuit microelectronic fabrication facility, the present invention may also be employed for managing work in process (WIP) workload within fabrication facilities including but not limited to electronic fabrication facilities, microelectronic fabrication facilities, mechanical fabrication facilities and chemical fabrication facilities, particularly under circumstances where the fabrication facilities are nominally distributed fabrication facilities which fabricate multiple part numbers of fabrications while employing multiple process descriptions and multiple fabrication tools with the context of multiple fabrication and production priorities. More specifically with respect to fabrication of microelectronic fabrications, the system and method of the present invention may be employed for fabricating microelectronic fabrications including but not limited to integrated circuit microelectronic fabrications, ceramic substrate microelectronic fabrications, solar cell optoelectronic microelectronic fabrications, sensor image array optoelectronic microelectronic fabrications and display image array optoelectronic microelectronic fabrications.

Referring now to FIG. 1, there is shown, with respect to a fabrication facility, a schematic diagram of Fabrication Processing Progression to Finished Product which illustrates a problem towards whose resolution the present invention is directed.

Shown within FIG. 1 in general is a fabrication processing progression for a new work-in-process (WIP) workload lot which is to be fabricated within a fabrication facility to provide a finished product from the new work-in-process (WIP) workload lot. Also illustrated within the schematic diagram of FIG. 1 by the characters A, B, C, D, a, b, c, d, w, x, y and z are individual fabrication tools which are employed for sequentially fabricating both the new work-in-process (WIP) workload lot to finished product within the fabrication facility, as well as a quantity of existing work-in-process (WIP) workload lots to finished product within the fabrication facility.

For purposes of illustrating the problem towards whose resolution the present invention is directed, the fabrication tools designated as A, B, C and D within FIG. 1 are intended as work-in-process (WIP) workload lot dedicated fabrication tools which provide an equivalent fabrication function within the fabrication processing progression, but: (1) for which within the context of a specific process routing; and (2) for which within the context of a specific microelectronic fabrication product, only one fabrication tool within the series of work in process (WIP) workload lot dedicated fabrication tools A, B, C and D may be employed multiply and sequentially when fabricating a microelectronic fabrication within the microelectronic fabrication facility.

Most typically and preferably, within the context of the present invention, each of the series of work-in-process (WIP) workload lot dedicated fabrication tools A, B, C, and D is a photoexposure tool, such as but not limited to a deep ultraviolet (DUV) photoexposure tool, for which a photoexposure tool lens distortion requires that only a single work-in-process (WIP) workload lot dedicated fabrication tool within the series of work-in-process (WIP) workload lot dedicated fabrication tools A, B, C and D may be employed when photolithographically fabricating various layers within a single microelectronic fabrication or a single microelectronic fabrication work-in-process (WIP) workload lot, in order to fulfill a first overlay tolerance requirement when fabricating the single microelectronic fabrication or the single microelectronic fabrication work-in-process (WIP) workload lot.

Typically and preferably, the first overlay tolerance requirement is less than about 80 nanometers. The present invention may, however, theoretically also be employed where the series of work-in-process (WIP) workload lot dedicated fabrication tools A, B, C and D consists of other than photoexposure tools, and may include, but is not limited to, etch tools, deposition tools and ion implant tools.

Similarly, and also most typically and preferably, within the context of the preferred embodiment of the present invention, each fabrication tool within the series of fabrication tools a, b, c and d is a work-in-process (WIP) workload lot matched fabrication tool which performs an equivalent function, but not the same function as the series of work-in-process (WIP) workload lot dedicated fabrication tools A, B, C and D, but where each work-in-process (WIP) workload lot dedicated fabrication tool within the series of work-in-process (WIP) workload lot dedicated fabrication tools a, b, c and d is matched to a work-in-process (WIP) workload lot dedicated fabrication tool within the series of work-in-process (WIP) workload lot dedicated fabrication tools A, B, C and D such that when a specific work-in-process (WIP) workload lot dedicated fabrication tool A, B, C or D within the series of work-in-process (WIP) workload lot dedicated fabrication tools A, B, C or D is employed for fabricating a specific work-in-process (WIP) workload lot within a fabrication facility a particular correlating workin-process (WIP) workload lot matched fabrication tool a, b, c or d within the series of work-in-process (WIP) workload lot matched fabrication tools a, b, c and d is also employed for fabricating the specific work-in-process (WIP) workload lot within the fabrication facility.

For example and without limitation, within the preferred embodiment of the present invention where the series of work-in-process (WIP) workload lot dedicated fabrication tools A, B, C and D consists of a series of deep ultraviolet (DUV) photolithographic exposure tools which provides the first overlay tolerance of less than about 80 nanometers, the series of work-in-process (WIP) workload lot matched fabrication tools a, b, c and d typically and preferably consists of a series of i-line photolithographic exposure tools which provides a second overlay tolerance of from about 80 nanometers to about 100 nanometers. The series of work-in-process (WIP) workload lot matched fabrication tools may need to be matched to the series of work-in-process (WIP) workload lot dedicated fabrication tools for related lens distortion reasons.

Finally, within the preferred embodiment of the present invention with respect to the series of fabrication tools designated as w, x, y and z, the series of fabrication tools designated as w, x, y and z is intended as fabrication tools which are not required to be dedicated or matched to the fabrication tools designated as A, B, C, D, a, b, c or d, but may nonetheless be repetitively employed when fabricating a microelectronic fabrication. Within the context of the preferred embodiment of the present invention, where the work-in-process (WIP) workload lot dedicated fabrication tools A, B, C and D are for example deep ultraviolet (DUV) photoexposure tools which provide the first overlay tolerance of less than about 80 nanometers, and the work-in-process (WIP) workload lot matched fabrication tools a, b, c and d are for i-line photoexposure tools which provide the second overlay tolerance of from about 80 to about 100 nanometers, the non-dedicated and non-matched work-in-process (WIP) workload lot fabrication tools w, x, y and z may for example be a series of i-line photoexposure tools which provides an overlay tolerance of greater than about 100 nanometers.

As is understood by a person skilled in the art, within the context of a fabrication facility having the fabrication tool distribution as illustrated within the schematic diagram of FIG. 1, and in conjunction with the fabrication processing progression as illustrated within the schematic cross-sectional diagram of FIG. 1, there will also exist, as noted above, and although not specifically illustrated within the schematic diagram of FIG. 1, an existing work-in-process (WIP) workload within the fabrication facility, wherein the existing work-in-process (WIP) workload within the fabrication facility is distributed within the context of various stages of fabrication processing progression within the fabrication facility.

Finally, and also as noted above, there is also illustrated within the schematic diagram of FIG. 1 a new work-in-process (WIP) workload lot, wherein the problem towards whose resolution the present invention is directed is a determination of which of the work-in-process (WIP) workload lot dedicated fabrication tools A, B, C and D the new work-in-process (WIP) workload lot should be allocated upon introduction into the fabrication facility in order to provide enhanced operation and efficient management of the fabrication facility within which is employed the series of fabrication tools A, B, C, D, a, b, c, d, w, x, y and z. Within the context of semiconductor integrated circuit microelectronic fabrication facilities, and under circumstances where the series of fabrication tools A, B, C and D consists of a series of photolithographic work-in-process (WIP) workload lot dedicated fabrication tools, the problem towards whose resolution the present invention is directed will generally involve a selection of a particular photolithographic work-in-process (WIP) workload lot dedicated fabrication tool intended in a first instance for photolithographically defining a blanket silicon nitride layer in turn employed for forming a series of isolation regions within a series of semiconductor substrates employed within a series of semiconductor integrated circuit microelectronic fabrications.

Figure 2:
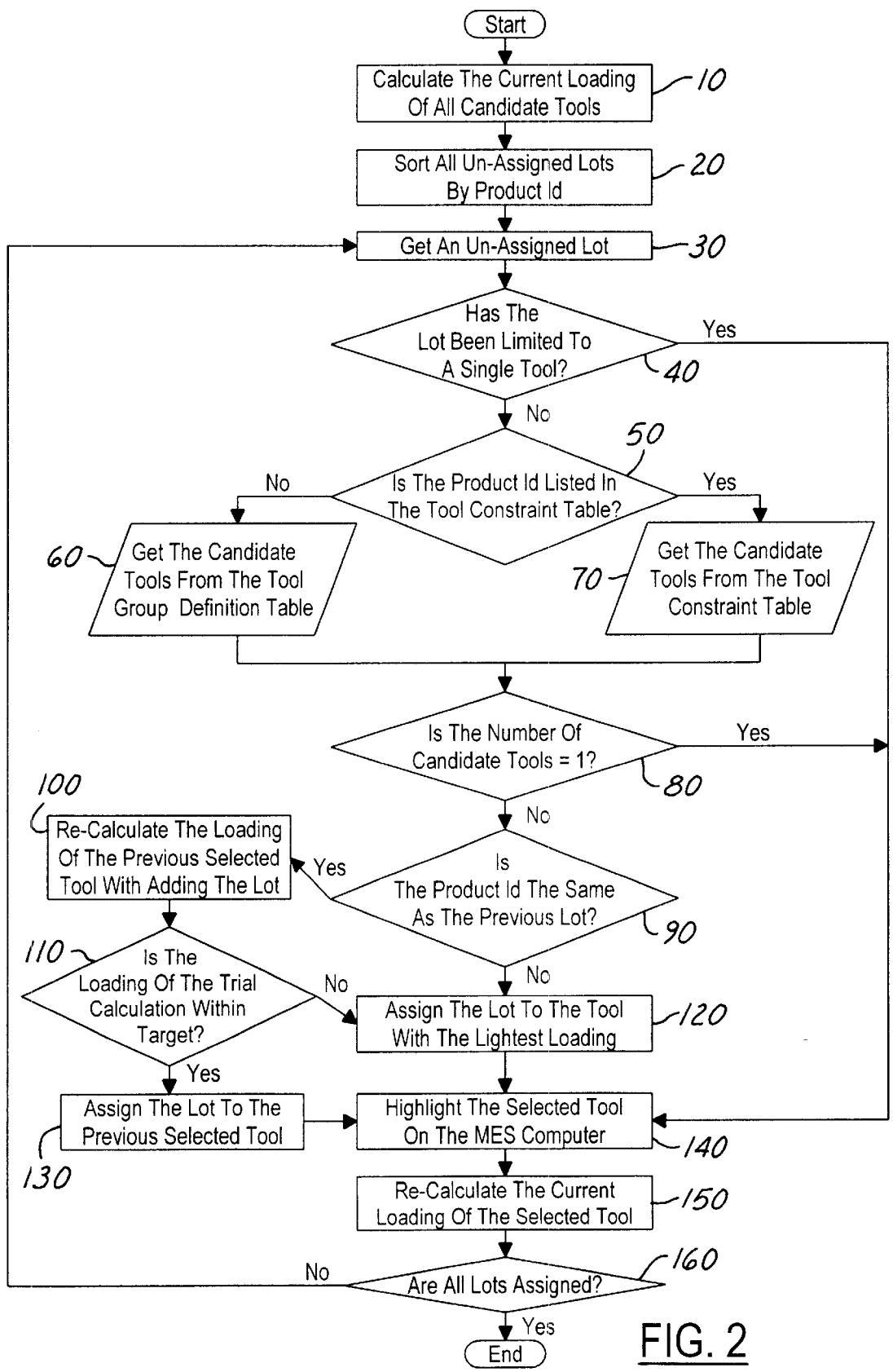
FIG. 2 shows an algorithmic flow diagram which corresponds with the method of the present invention.

Referring now to FIG. 2, there is shown an algorithmic flow diagram illustrating, in accord with a preferred embodiment of the present invention, a method in accord with the present invention. As is understood by a person skilled in the art, the method in accord with the present invention is intended to assist in resolution of the problem towards whose resolution the present invention is directed.

As is shown in the algorithmic flow diagram of FIG. 2, and in accord with the block which corresponds with reference numeral 10, there is first determined a current tool loading of all candidate tools within the fabrication facility. Within the context of the preferred embodiment of the present invention, and in accord with the schematic diagram of FIG. 1, the candidate tools for which there is determined a current tool loading are intended as the series of work-in-process (WIP) workload lot dedicated fabrication tools A, B, C and D, and possibly as an alternative or as an adjunct the series of work-in-process (WIP) workload lot matched fabrication tools a, b, c and d.

Further, with respect to a specific calculation which may be employed for determining a current loading of each of the candidate tools which may comprise at least the series of work-in-process (WIP) workload lot dedicated fabrication tools A, B, C and D, such a specific calculation of a current loading may be determined employing equation 1, as follows:

$$L_i = \Sigma_j (Q_{ij} \times D_{ij}/T_{ij})/C_i \qquad (1)$$

where:
$L_i$=current loading of tool i
$C_i$=time based capacity of tool i
$Q_{ij}$=existing WIP quantity of lot j dedicated to tool i
$D_{ij}$=number of remaining processing events of lot j in tool i
$T_{ij}$=remaining cycle time to the last processing event of lot j in tool i (as estimated in accord with theoretical cycle time and lot priority).

Referring again to the algorithmic flow diagram of FIG. 2, and in accord with the block which corresponds with reference numeral 20, there is then sorted all un-assigned work-in-process (WIP) workload lots by product identification number. Within the preferred embodiment of the present invention, such un-assigned work-in-process (WIP) workload lots are intended as representative of the new work-in-process (WIP) workload lot as illustrated within the schematic diagram of FIG. 1.

Referring again to the algorithmic flow diagram of FIG. 2, and in accord with the blocks which correspond with reference numeral 30 and reference numeral 40, there is then newly selected an un-assigned work-in-process (WIP) workload lot (in the sorted sequence) and determined whether the newly selected un-assigned work-in-process (WIP) workload lot has been limited to, but not yet assigned to, a single work-in-process (WIP) workload lot dedicated fabrication tool. If the newly selected un-assigned work-in-process (WIP) workload lot has been limited to, but not yet assigned to, a single work-in-process (WIP) workload lot dedicated fabrication tool, and in accord with the block which corresponds with reference numeral 140, the single work-in-process (WIP) workload lot dedicated fabrication tool is highlighted as a selected fabrication tool on a manufacturing execution system (MES) computer terminal for the newly selected un-assigned work-in-process (WIP) workload lot.

If the newly selected un-assigned work-in-process (WIP) workload lot has not been limited to a single work-in-process (WIP) workload lot dedicated fabrication tool, and in accord with the block which corresponds with reference numeral 50, an additional inquiry is made as to whether the product identification number for the for the newly selected un-assigned work-in-process (WIP) workload lot is listed within a tool constraint table. If the product identification number of the newly selected un-assigned work-in-process (WIP) workload lot is listed within a tool constraint table, and in accord with the block which corresponds with reference numeral 70, a list of candidate work-in-process (WIP) workload lot dedicated fabrication tools for assignment of the newly selected work-in-process (WIP) workload lot is obtained from the tool constraint table. Similarly, if the product identification number of the newly selected un-assigned work-in-process (WIP) workload lot is not listed within a tool constraint table, and in accord with the block which corresponds with reference numeral 60, a list of candidate work-in-process (WIP) workload lot dedicated tools is obtained instead from a tool group definition table. Regardless of whether the list of candidate work-in-process (WIP) workload lot dedicated fabrication tools is obtained from a tool group definition table (which generally provides fundamental information regarding tool groups) in accord with the block which corresponds with reference numeral 60 or a tool constraint table (which generally provides more refined and limiting information regarding tool groups) in accord with the block which corresponds with reference numeral 70, and further in accord with the block which corresponds with reference numeral 80, an additional inquiry is made as to whether a number of candidate work-in-process (WIP) workload lot dedicated fabrication tools to which the newly selected un-assigned work-in-process (WIP) workload lot may be assigned is equal to one.

If the number of candidate tools to which the newly selected un-assigned work-in-process (WIP) workload lot may be assigned is equal to one, and again in accord with the block which corresponds with reference numeral 140, the work-in-process (WIP) workload lot dedicated tool is highlighted on the manufacturing execution system (MES) computer system as a selected tool and the newly selected un-assigned work-in-process (WIP) workload lot is assigned thereto.

If the number of candidate tools to which the newly selected un-assigned work-in-process (WIP) workload lot may be assigned is not equal to one, and in accord with the block which corresponds with reference numeral 90, an additional inquiry is made as to whether the product identification number for the newly selected un-assigned work-in-process (WIP) workload lot is equivalent to a product identification number for a previously selected un-assigned work-in-process (WIP) workload lot (i.e., a determination is made as to whether a parent un-assigned work-in-process (WIP) workload lot been divided to provide more than one child un-assigned work-in-process (WIP) workload lot which may be selected). If not, and in accord with the block which corresponds with reference numeral 120, the newly selected un-assigned work-in-process (WIP) workload lot is assigned to a fabrication tool within the group of fabrications tools, such as the group of work-in-process (WIP) workload lot dedicated fabrication tools A, B, C and D within the schematic diagram of FIG. 1, which has the lightest work-in-process (WIP) workload loading.

Similarly, if the inquiry in accord with the block which corresponds with reference numeral 90 is answered in the affirmative, and in accord with the block which corresponds with reference numeral 100, there is recalculated an existing work-in-process (WIP) workload loading of the previously selected work-in-process (WIP) workload lot dedicated fabrication tool within the context of the newly selected un-assigned work-in-process (WIP) workload lot, and further in accord with the block which corresponds with reference numeral 110 an additional inquiry is made as to whether the recalculation of the work-in-process (WIP) workload loading of the previously selected work-in-process (WIP) workload lot dedicated fabrication tool provides a trial calculation for the work-in-process (WIP) workload loading of the previously selected work-in-process (WIP) workload lot dedicated fabrication tool which is within a target range for work-in-process (WIP) workload loading of the previously selected work-in-process (WIP) workload lot dedicated fabrication tool. If that inquiry is also answered in the affirmative, and in accord with the blocks which correspond with reference numerals 130 and 140, the newly selected un-assigned work-in-process (WIP) workload lot is assigned to the previously selected work-in-process (WIP) workload lot dedicated fabrication tool and the previously selected work-in-process (WIP) workload lot dedicated fabrication tool is highlighted within the manufacturing execution system (MES) computer system such as to assign the newly selected work-in-process (WIP) workload lot to the previously selected work-in-process (WIP) workload lot dedicated fabrication tool.

Similarly, if the inquiry as proposed within the block which corresponds with reference numeral 110 is answered in the negative, and in accord with the blocks which correspond with reference numerals 120 and 140, the newly selected un-assigned work-in-process (WIP) workload lot is assigned to the work-in-process (WIP) workload lot dedicated fabrication tool with the lightest loading and the work-in-process (WIP) workload lot dedicated fabrication tool with the lightest loading is instead highlighted on the manufacturing execution system (MES) computer system as the selected work-in-process (WIP) workload lot dedicated fabrication tool for the newly selected work-in-process (WIP) workload lot.

Referring again to FIG. 2, and in accord with the block which corresponds with reference numeral 150, there is then recalculated the current loading of the selected work-in-process (WIP) workload lot dedicated fabrication tool once having assigned thereto the newly selected un-assigned work-in-process (WIP) workload lot.

Referring finally again to FIG. 2, and in accord with the block which corresponds with reference numeral 160, an inquiry is made as to whether all unassigned work-in-process (WIP) workload lots have been assigned. If all un-assigned work-in-process (WIP) workload lots have not been assigned, the process as outlined in FIG. 2 is repeated starting again with the block which corresponds with reference numeral 30. If all un-assigned work-in-process workload lots have been assigned, the algorithm as illustrated within the algorithmic flow diagram of FIG. 2 is terminated.

As is understood by a person skilled in the art, each of the process steps within the algorithmic flow diagram as illustrated within FIG. 2 may be performed with the assistance of a computer system programmed to facilitate each of the process steps within the algorithmic flow diagram as illustrated within FIG. 2.

Similarly, as is also understood by a person skilled in the art, upon execution with respect to a group of newly selected work-in-process (WIP) workload lots introduced into a fabrication facility the group of process steps in accord with the algorithmic flow diagram of FIG. 2, there is provided enhanced operation and efficient management of the fabrication facility. The present invention realizes the foregoing object by employing when assigning a newly selected work-in-process (WIP) workload lot to a specific work-in-process (WIP) workload lot dedicated fabrication tool within a series of work-in-process (WIP) workload dedicated fabrication tools a consideration of an existing work-in-process workload loading for each work-in-process (WIP) workload lot dedicated fabrication tool within the group of work-in-process (WIP) workload lot dedicated fabrication tools.

As is further understood by a person skilled in the art, the preferred embodiment of the present invention is illustrative of the present invention rather than limiting of the present invention. Revisions and modifications may be made to materials, fabrication tools, fabrication processes and fabrication facilities which are employed within the preferred embodiment of the present invention while still providing a system in accord with the present invention and a method in accord with the present invention, further in accord with the accompanying claims.

What is claimed is:

1. A method for managing within a fabrication facility a work-in-process (WIP) workload comprising:
   providing a fabrication facility comprising:
      a plurality of fabrication tools which perform an equivalent fabrication function; and
      at least one quantity of existing work-in-process (WIP) workload which requires multiple sequential processing within only one fabrication tool within the plurality of fabrication tools which perform the equivalent fabrication function;
   determining for the plurality of fabrication tools which perform the equivalent fabrication function a plurality of tool loading coefficients which take into consideration complete processing of the at least one quantity of work-in-process (WIP) workload which requires multiple sequential processing within the only one fabrication tool within the plurality of fabrication tools which perform the equivalent fabrication function;
   introducing into the fabrication facility a quantity of new work-in-process (WIP) workload which also requires multiple sequential processing within only one fabrication tool within the plurality of fabrication tools which performs the equivalent fabrication function, wherein the quantity of new work-in-process (WIP) workload is allocated to a fabrication tool within the plurality of fabrication tools which perform the equivalent fabrication function having a most favorable tool loading coefficient within the plurality of tool loading coefficients.

2. The method of claim 1 wherein the fabrication facility is selected from the group consisting of electronic fabrication facilities, microelectronic fabrication facilities, mechanical fabrication facilities and chemical fabrication facilities.

3. The method of claim 1 wherein the fabrication facility is a microelectronic fabrication facility selected from the group consisting of integrated circuit microelectronic fabrication facilities, ceramic substrate microelectronic fabrication facilities, solar cell optoelectronic microelectronic fabrication facilities, sensor image array optoelectronic microelectronic fabrication facilities and display image array optoelectronic microelectronic fabrication facilities.

4. The method of claim 1 wherein the plurality of fabrication tools is a plurality of photolithographic fabrication tools.

5. The method of claim 4 wherein the plurality of photolithographic fabrication tools is selected from the group consisting of deep ultraviolet (DUV) photoexposure photolithographic fabrication tools and i-line photoexposure photolithographic fabrication tools.

6. The method of claim 1 wherein the plurality of tool loading coefficients is determined employing the equation:

$$L_i = \Sigma_i (Q_{ij} \times D_{ij}/T_{ij})/C_i \qquad (1)$$

where:

$L_i$ = current loading of tool i $C_i$ = time based capacity of tool i $Q_{ij}$ = existing WIP quantity of lot j dedicated to tool i $D_{ij}$ = number of remaining processing events of lot j in tool i $T_{ij}$ = remaining cycle time to the last processing event of lot j in tool i.

7. The method of claim 1 wherein the method is a computer assisted method.

8. A system for managing within a fabrication facility a work-in-process (WIP) workload comprising:
   means for determining within a fabrication facility comprising:
      a plurality of fabrication tools which perform an equivalent fabrication function; and
      at least one quantity of existing work-in-process (WIP) workload which requires multiple sequential processing within only one fabrication tool within the plurality of fabrication tools which perform the equivalent fabrication function, and for the plurality of fabrication tools which perform the equivalent fabrication function, a plurality of tool loading coefficients which take into consideration complete processing of the at least one quantity of work-in-process (WIP) workload which requires multiple sequential processing within the only one fabrication tool within the plurality of fabrication tools which perform the equivalent fabrication function;
   means for introducing into the fabrication facility a quantity of new work-in-process (WIP) workload which also requires multiple sequential processing within only one fabrication tool within the plurality of fabrication tools which performs the equivalent fabrication function, wherein the quantity of new work-in-process (WIP) workload is allocated to a fabrication tool within the plurality of fabrication tools which perform the equivalent fabrication function having a most favorable tool loading coefficient within the plurality of tool loading coefficients.

9. The system of claim 8 wherein the fabrication facility is selected from the group consisting of electronic fabrication facilities, microelectronic fabrication facilities, mechanical fabrication facilities and chemical fabrication facilities.

10. The system of claim 8 wherein the fabrication facility is a microelectronic fabrication facility selected from the group consisting of integrated circuit microelectronic fabrication facilities, ceramic substrate microelectronic fabrication facilities, solar cell optoelectronic microelectronic fabrication facilities, sensor image array optoelectronic microelectronic fabrication facilities and display image array optoelectronic microelectronic fabrication facilities.

11. The system of claim 8 wherein the plurality of fabrication tools is a plurality of deep ultraviolet (DUV) photolithographic fabrication tools.

12. The system of claim 11 wherein the plurality of photolithographic fabrication tools is selected from the group consisting of photoexposure photolithographic fabrication tools and metrology photolithographic fabrication tools.

13. The system of claim 8 wherein the plurality of tool loading coefficients is determined employing the equation:

$$L_i = \Sigma_i (Q_{ij} \times D_{ij}/T_{ij})/C_i \quad (1)$$

where:

$L_i$=current loading of tool i $C_i$=time based capacity of tool i $Q_{ij}$=existing WIP quantity of lot j dedicated to tool i $D_{ij}$=number of remaining processing events of lot j in tool i $T_{ij}$=remaining cycle time to the last processing event of lot j in tool i.

14. The system of claim 8 wherein the system is a computer assisted system.

* * * * *